Dec. 18, 1962   G. BRUCK ET AL   3,069,677
REFRACTION CORRECTION FOR RADAR HEIGHT FINDER
Filed July 17, 1959   5 Sheets-Sheet 1

INVENTORS.
GEORGE BRUCK
LEE C. KEENE
ROBERT J. SCHIPPER
BY Alden D. Redfield
Irwin P. Garfinkle
ATTORNEYS.

United States Patent Office 3,069,677
Patented Dec. 18, 1962

3,069,677
REFRACTION CORRECTION FOR RADAR
HEIGHT FINDER
George Bruck and Lee C. Keene, Cincinnati, Ohio, and Robert J. Schipper, Crestview Hill, Ky., assignors to Avco Corporation, Cincinnati, Ohio, a corporation of Delaware
Filed July 17, 1959, Ser. No. 827,932
2 Claims. (Cl. 343—5)

This invention relates to height finding radar apparatus capable of accurately determining the height of targets in space at long ranges and at low elevation angles.

It is known that a radar beam originating on the surface of the earth does not travel in a straight line but, due to the refraction characteristics of the atmosphere, follows a curved path bending toward the earth. Because of this refraction characteristic, very serious errors are introduced into the results of height determining radars and, where used for enabling interception of high speed aircraft or missiles at long ranges and at low altitudes, the refraction error is apt to cause failure. The object of this invention is to provide apparatus for a height finding radar which automatically and accurately corrects for errors in height resulting from the refraction of the radar beam as it travels through the atmosphere.

Another object of this invention is to apply to a height finding radar a correction which is a function of index of refraction and of angle of elevation of the radar beam.

Still another object of this invention is to provide a specific height correction for variation of refractive index in specific air mass types.

A still further object of this invention is to provide for a height determining radar a correction factor which is a function of a particular refractive index profile and of angle of elevation of the radar beam and, hence, a refraction correction which is a function of range, height and weather conditions.

For a more complete understanding of the nature and other objects of this invention, reference should now be made to the following detailed description and to the accompanying drawings, in which.

Figure 1:
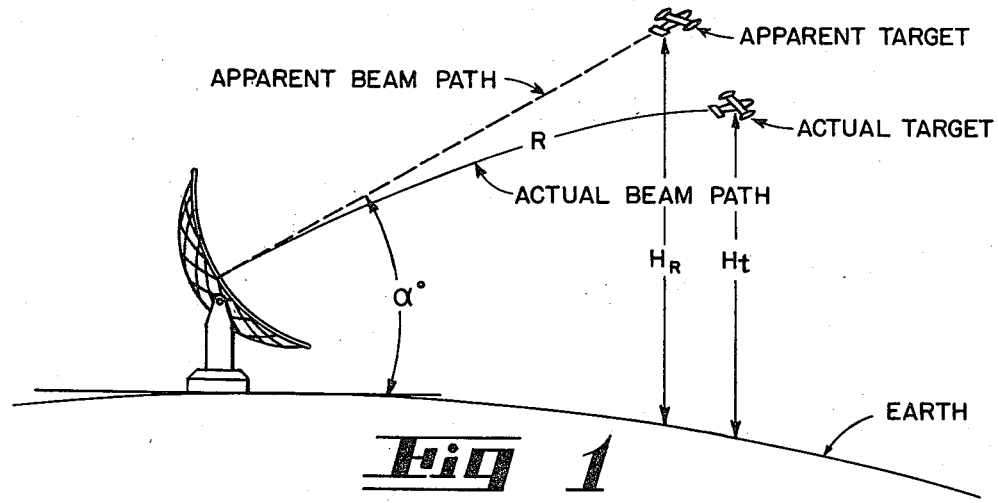
FIG. 1 is a schematic representation of the refraction problem.

The refraction problem of a height finding radar is depicted in FIG. 1, which shows a height finding radar antenna originating a radar beam towards an actual target at a range R. Because of the refraction characteristics of the atmosphere, the actual path of the radar beam is curved as illustrated by the solid line; however, the apparent beam path appears to follow the dotted line which is at an elevation angle $\alpha$ with the horizontal. This means that the apparent height $H_R$ of the target will be considerably greater than the actual height $H_t$. It is obvious, therefore, that some correction factor must be introduced into the system to correct for the errors due to refraction.

Figure 3:
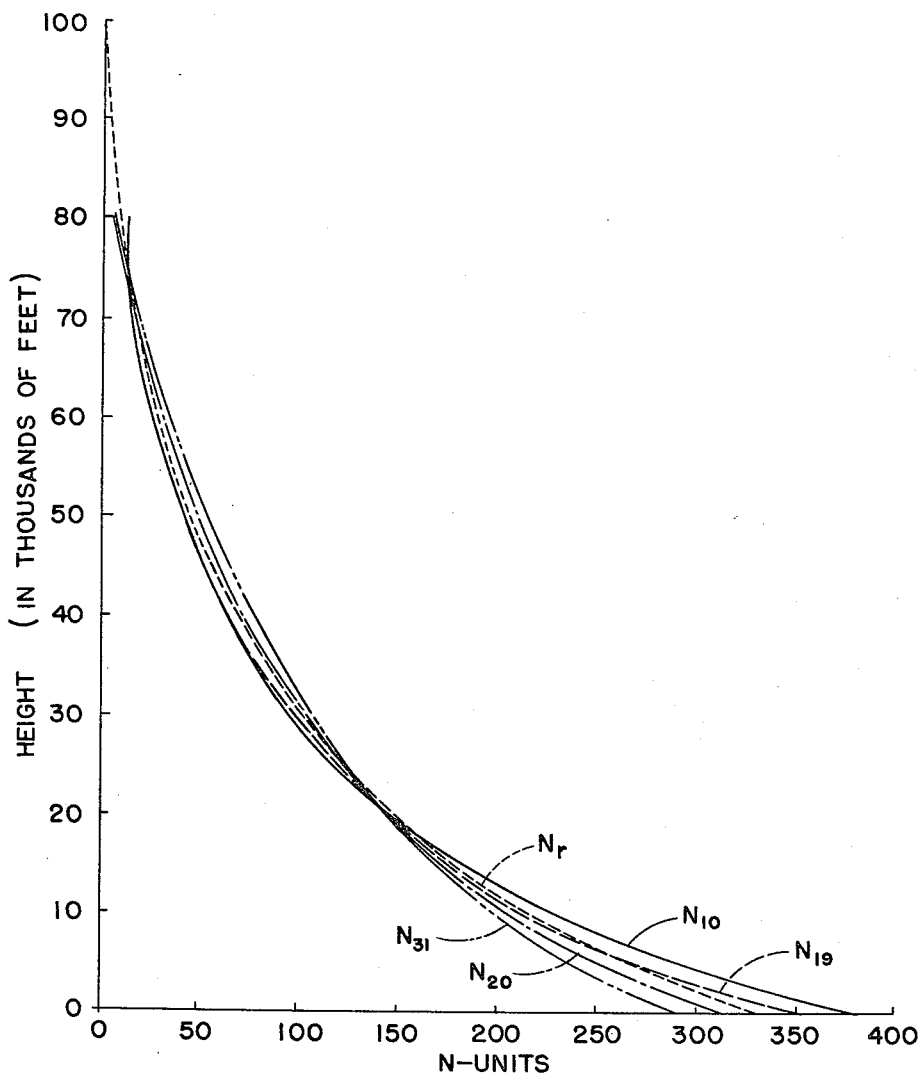
FIG. 3 is a series of curves representing the known refraction characteristics of representative air masses at varying heights.

Many studies have been made of the characteristics of the earth's atmosphere, the results of these studies indicating that the index of refraction of the atmosphere is dependent on temperature, pressure and dew point at the place under study and, thus, is not a constant for all points in the atmosphere. Therefore, the refraction or actual bending of a radar beam, since it depends on the index of refraction along each point in the path of the beam, will not be a constant but will vary according to the atmospheric conditions along the beam path. Recent studies have shown that the refraction characteristics of the entire atmosphere can be characterized by a limited number of height profiles; that is to say, accurate plots have been made of the refractive characteristics of the atmosphere (measured in N-units) vs. height. Five such profiles, $N_r$, $N_{10}$, $N_{19}$, $N_{20}$, and $N_{31}$, are illustrated in FIG. 3, each profile representing a specific type of air mass. That is to say, the profile $N_{10}$ represents the refraction vs. height characteristics of a beam passing through a wet air mass; $N_{19}$, moist– $N_{20}$, medium dry; $N_{31}$, dry; and $N_r$, average (or reference).

Previous to the results of the studies as indicated in FIG. 3, a constant correction factor was applied to the height information determined by the height finding radar in accordance with the known equation:

$$H_t = \frac{R^2}{2cr_0} + R \sin \alpha$$

where
$H_t$=real height;
$R$=range;
$r_0$=radius of the earth;
$\alpha$=elevation angle of the radar beam; and
$c$=a fixed correction factor for refraction.

As a result of the studies as represented by the results illustrated in FIG. 3, height finding systems were introduced dividing the atmosphere in stratified layers and incorporating several fixed refraction corrections insertable (as a function of target height) to compensate for the difference of refraction among the various layers. However, while such systems were an improvement over the earlier versions which used a fixed correction factor, nevertheless, serious height errors were still introduced. The elimination of these height errors is now sought, and by this invention means are provided for applying an automatically variable height correction factor which is a function of the various index of refraction profiles (index of refraction vs. height) and which is also a function of elevation angle and range. In this way account is taken of the period of time that a ray is traveling through each level of the varying atmosphere, whereas in previous systems refraction was accounted for at only one level in the atmosphere.

Knowing the index of refraction along every point in the path of a traveling beam and using Snell's law (see volume 13 of the Radiation Laboratory Series, McGraw-Hill, page 46), an exact equation for the beam path can be derived as follows:

$$R = \int_0^{H_t} \frac{dh}{\sqrt{1 - \left[\frac{n_0}{n}\right]^2 \left[\frac{r_0}{r_0 + h}\right]^2 \cos^2 \alpha_0}}$$

where
$R$=length of beam path to target;
$H_t$=real height of target;
$dh$=change of height between adjacent points along the path of radar beam;
$n_0 = 1 + N_0 10^{-6}$ (by definition)=coefficient of refraction at surface of earth;
$N_0$=index of refraction at surface of earth;
$n = 1 + N 10^{-6}$ (by definition)=coefficient of refraction at any point along the beam path as a function of altitude;
$N$=index of refraction at any point along the beam path;

$r_0$ = radius of earth;
$h$ = height at any point along the beam path; and
$\alpha_0$ = elevation angle of beam at the transmitter.

However, this equation is not integrable and cannot be applied to the input of a computer. In order to produce an equation which is readily adaptable to modern computing techniques, the foregoing equation is converted into two parts, the first part yielding height information up to a low finite altitude $H_0$ (in practice, less than 1,000 feet depending on required computational accuracy) and the second part yielding height information above the altitude $H_0$, as follows:

$$R = \sqrt{\frac{\sin^2 \alpha_0 + 2H_0\left[\frac{1}{r_0} - \frac{1}{r_1}\right] - \sin \alpha_0}{\left[\frac{1}{r_0} - \frac{1}{r_1}\right]\cos^2 \alpha_0}}$$

$$+ \int_{H_0}^{H_t} \frac{dh}{\sqrt{1 - \left[\frac{n_0}{n}\right]^2 \left[\frac{r_0}{r_0+h}\right]^2 \cos^2 \alpha_0}}$$

where $$r_1 = \frac{h}{(N_0 - N)10^{-6}}$$

(slope of index of refraction curve at surface of the earth).

It may be readily understood that the analog mechanization of the foregoing equation is not practical and, if at all possible, would surely introduce errors as large as those sought to be corrected.

While the known simplified height finding equation, $$H_t = \frac{R^2}{2cr_0} + R \sin \alpha$$

is readily adaptable to mechanization, it has not produced the required accuracy at long ranges and at low elevation angles, even when $c$ is varied as a function of height. In accordance with this invention, a new height finding equation is presented introducing a new type of correction factor K which is a continuously variable function of both elevation angle and of the particular index of refraction profile N. In accordance with this invention, height is made equal to:

$$H_t = K(\alpha, N)\left[\frac{R^2}{2r_0} + R \sin \alpha\right]$$

Figure 4:
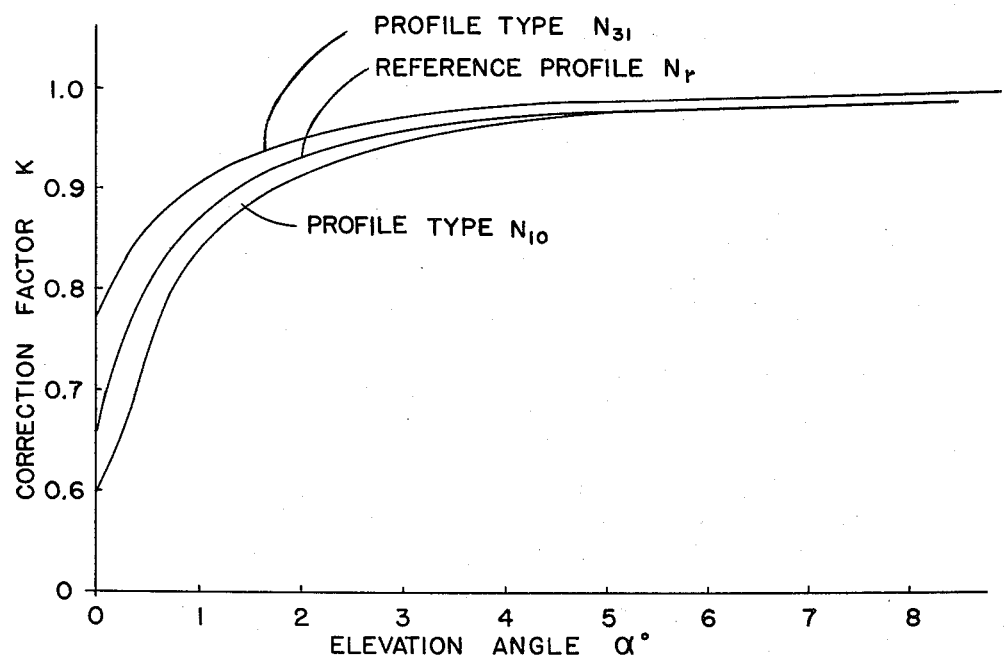
FIGS. 4–9 are curves representing height correction factors vs. elevation angle as determined in accordance with the teachings of this invention.
Figure 5:
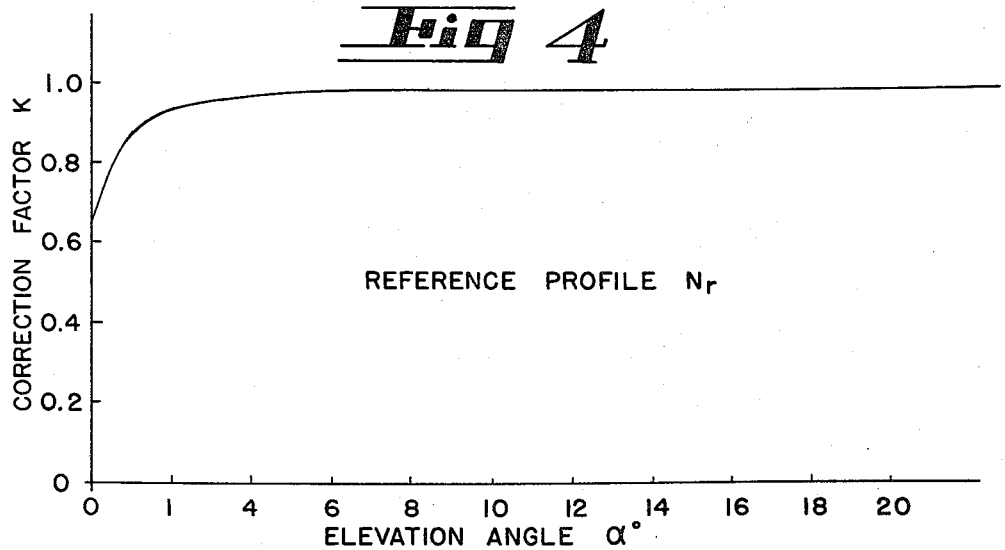
Figure 6:
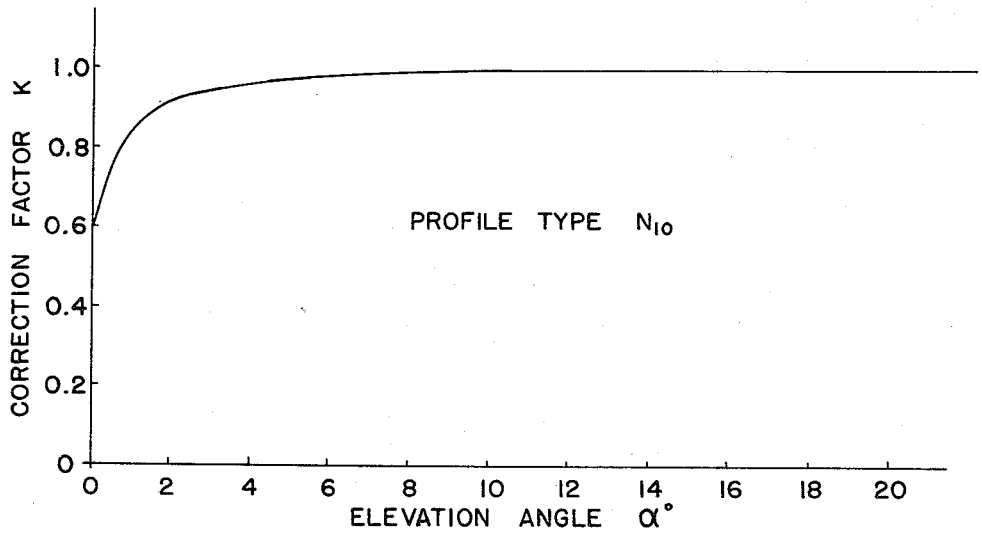
Figure 7:
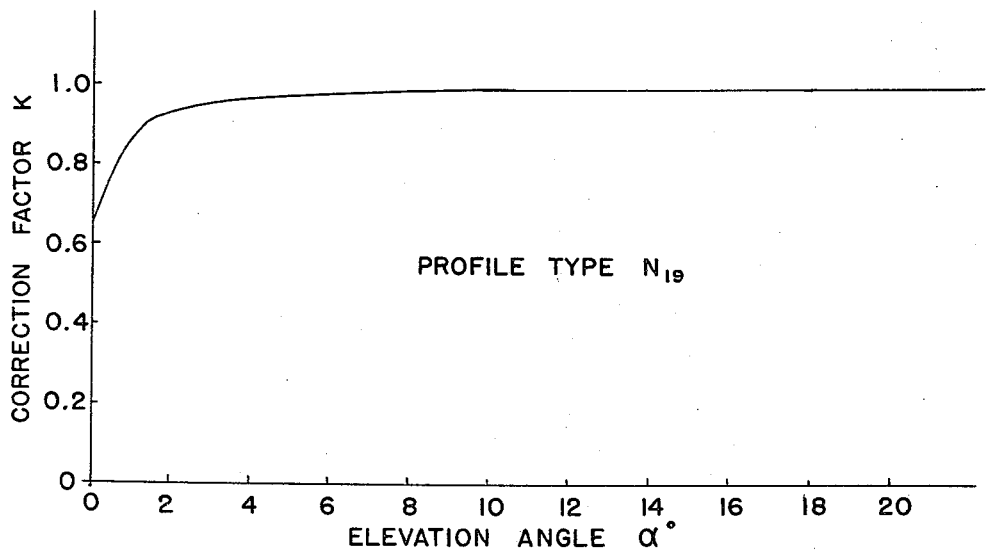
Figure 8:
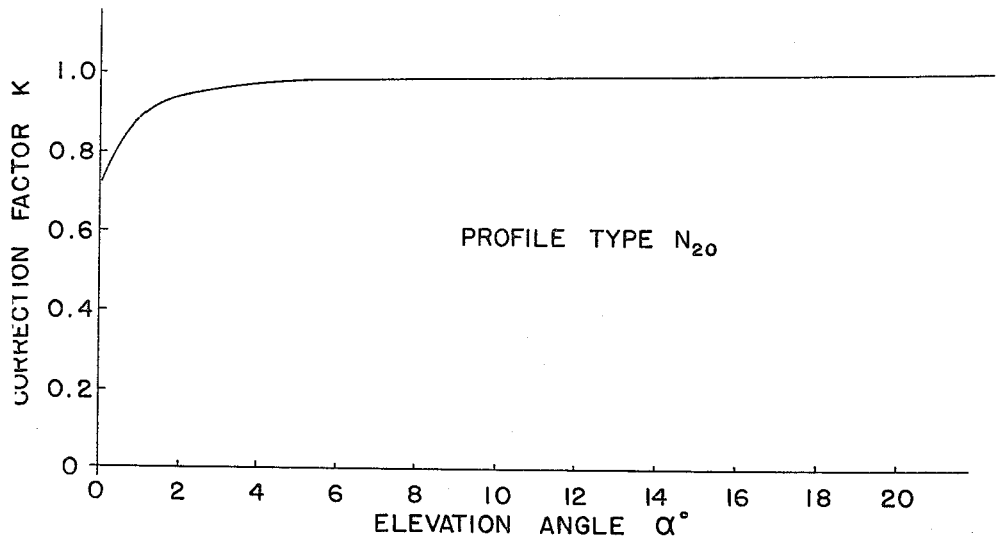
Figure 9:
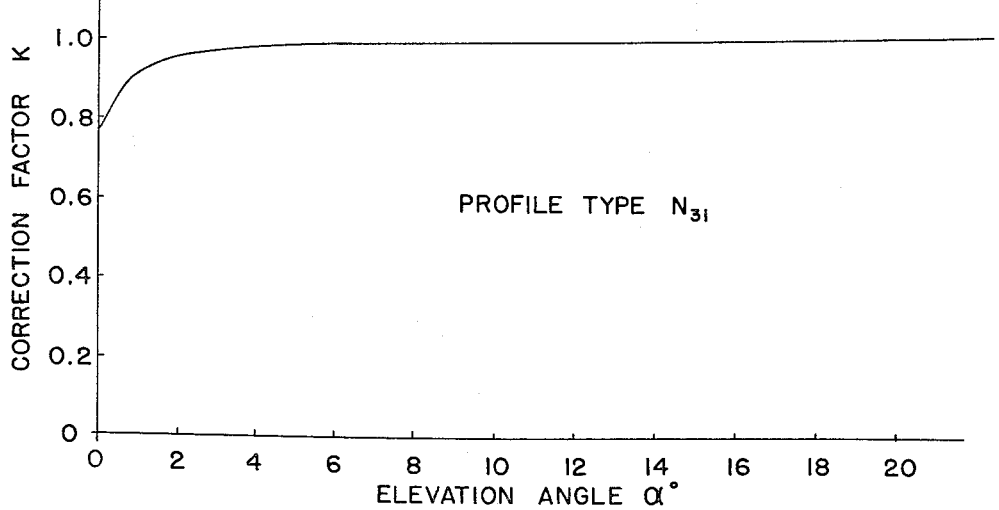

In order to determine K as a function of $\alpha$ and N, the exact equation was used to compute actual ray paths, the value of N being taken from the profile curves of FIG. 3 and separate computations being made for various angles of elevation, height, range, etc. From these computations the exact heights at various points along a beam path were plotted and compared with the apparent heights, and for each of the various air mass types (or profiles) a correction curve was derived representing the ratio of $$\frac{H_t}{H_R}$$

or real height to apparent height. These curves, which are illustrated in FIGS. 4–9, represent the correction factors necessary to correct the height equation as applied to any beam in a particular profile. FIGS. 5–9 show a correction factor for each profile vs. elevation angle, while FIG. 4 compares three of the profiles on an expanded scale. A function generator approximating each of the five curves may now be provided for driving the height sweep of a conventional radar display, known computing methods being available for solving the new height equation.

Figure 2:
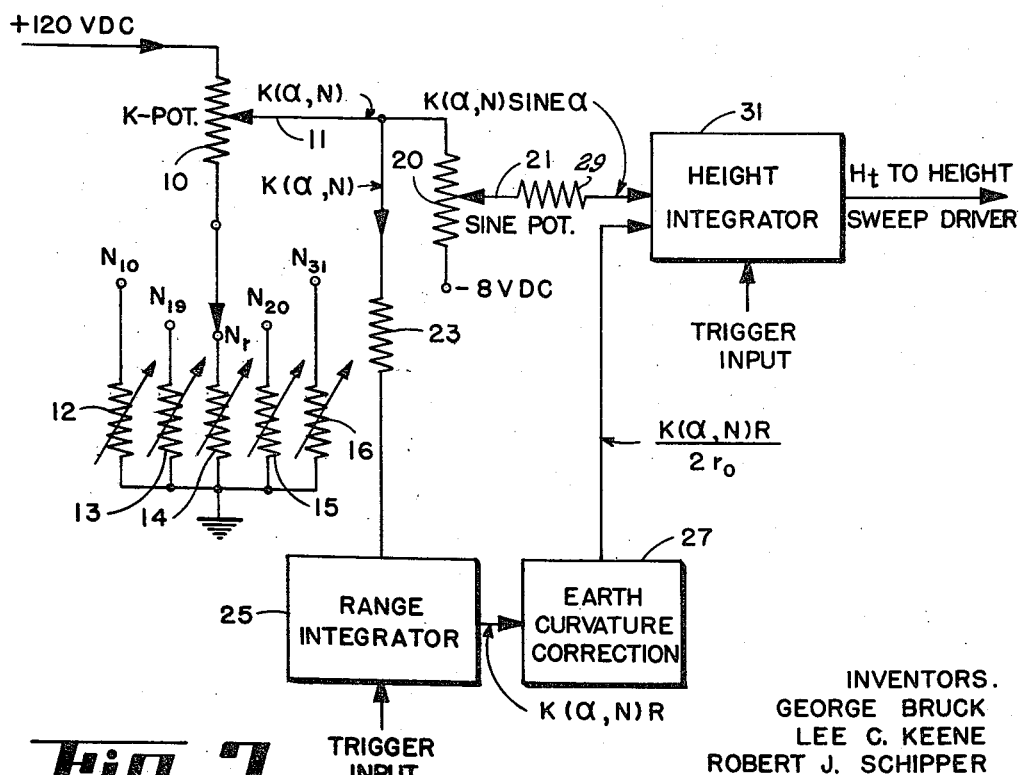
FIG. 2 is a schematic represenation of a preferred mechanization of the invention.

A height sweep circuit utilizing the refraction correction features of this invention is illustrated in FIG. 2 in block diagram form. This circuit includes a function generator which includes a K-potentiometer 10 supplied from a highly regulated direct current power source. The K-potentiometer has a shaped resistance curve corresponding to the correction curve $N_r$ illustrated in FIG. 5, providing a minimum conformity error for all five profiles. The wiper arm 11 of the K-potentiometer is mechanically coupled to the elevation axis of the radar antenna and, therefore, the output of the K-potentiometer is the refractive index correction as a function of elevation angle. Adjustment of the K output to compensate for the differences in correction factor required by each of the five profiles is obtained by switching in different values of series resistance, each resistance 12, 13, 14, 15 and 16 representing the differences among the various profiles illustrated in FIG. 3, and among the various correction curves, best illustrated in FIG. 4. Thus, the output at the wiper arm 11 of the K-potentiometer 10 is a function of the particular profile as well as elevation angle.

In order to solve for the height $H_t$ of a target, the height equation may be rewritten as $$H_t = \left[K(\alpha, N) \sin \alpha + \frac{K(\alpha, N)R}{2r_0}\right]R$$

To solve for the value of $K(\alpha, N) \sin \alpha$, the output of the K-potentiometer 10 is fed to a sine potentiometer 20, the resistance curve of which is a sine function. The wiper arm 21 of the sine potentiometer is also mechanically coupled to the antenna elevation axis and its output is, therefore, a D.C. voltage proportional to the sine of the elevation angle altered by the refraction correction $K(\alpha, N)$ and is proportional to $K(\alpha, N) \sin \alpha$. Where it is required to sweep at negative nod angles, the bottom of the sine potentiometer 20 may be connected to highly regulated negative power supply, as illustrated. At negative angles, the same refraction corrections would be applied as at 0° elevation.

In order to solve for the value of $$\frac{K(\alpha, N) R}{2 r_0}$$

the output of the K-potentiometer 10 is also fed through a resistor 23 to a range sweep integrator 25. The range sweep integrator 25 is conventional and generally it contains circuitry for generating a saw-tooth wave, the shape and amplitude of which is altered in direct relation to the K correction. As will be understood by a person skilled in the art, the saw-tooth wave generated in the range integrator 25 provides the range sweep for a cathode-ray display device (not illustrated) used in a conventional manner for displaying range and height information.

It is seen that the output of the range integrator is now equal to $K(\alpha, N)R$. This output is then altered by the earth's curvature correction circuit 27 which employs conventional circuitry to perform the required division function multiplying the output of the range sweep integrator 25 by a value proportional to $$\frac{1}{2r_0}$$

thus yielding a voltage proportional to $$\frac{K(\alpha, N)R}{2r_0}$$

which is applied to a height sweep integrator 31. The output of the sine potentiometer 20 is also applied to the height sweep integrator 31 through a resistor 29 where it is added with the output of the earth's curvature correction circuit 20 to produce a voltage proportional to $$K(\alpha, N) \sin \alpha + \frac{K(\alpha, N)R}{2r_0}$$

The height sweep integrator circuit is also conventional, containing a saw-tooth wave generator, the output of which is a function of range and elevation angle. The output of the height sweep integrator is, therefore a saw-tooth wave, the amplitude and shape of which is altered in direct relation to the combined output of the sine potentiometer 20, and the earth's curvature correction circuit 27. The output of the height sweep integrator 31 is the desired height equation:

$$H_t = K(\alpha, N)\left[\frac{R^2}{2r_0} + R \sin \alpha\right]$$

This output is applied to the height deflection drivers of the cathode-ray indicator scope.

In operation, an operator would first connect one of the resistors 12–16 to the K-potentiometer 10 for selection of the appropriate profile. To determine which profile to use, the operator first measures the dew point, temperature and barometric pressure at the surface of the earth in the vincinity of the equipment, and these values are substituted in the equation:

$$N = \frac{77P}{T} + \left[\frac{2.26 \times 10^6}{T^2}\right] e^{\left[5369\left(\frac{1}{273} - \frac{1}{T_D}\right)\right]}$$

where $T_D$ = dew point temperature (° K.);
$T$ = air temperature (° K.);
$P$ = barometric pressure (millibars); and
$e$ = 2.71828 (constant).

The value N which is determined by this equation may then be compared with the values of N at zero altitude, as represented by the profiles illustrated in FIG. 3, where it may be seen that:

$N = 387$ for profile $N_{10}$ (wet mass);
$N = 355$ for profile $N_{19}$ (moist air mass);
$N = 343$ for profile $N_R$ (average as reference air mass);
$N = 318$ for profile $N_{20}$ (medium dry air mass); and
$N = 294$ for profile $N_{31}$ (dry air mass).

The nearest profile is then selected by connecting in one of the resistors 12–16, which is provided with an appropriate value.

It is seen, therefore, that by means of this invention a simple and accurate system and method have been devised for accurately determining the height of an object above the surface of the earth and long ranges at low elevation angles. Broadly, this unique result is accomplished by using a new height equation incorporating a correction factor which is a function of both elevation angle and the particular weather conditions affecting the refraction profile. A radar equapped with apparatus in accordance with this invention and operating under many varied conditions has produced results having remarkagle accuracy.

Various modifications and adaptations will immediately become apparent to persons skilled in the art. For example, while a single K-potentiometer 10 has been illustrated in conjunction with five profile resistors 12–16, and is considered preferable in the present state of the art, it is entirely within the scope of this invention to use separate K-potentiometers, each incorporating the correction for the particular reference profile. Furthermore, methods other than that illustrated for solving the height equation may become available. Any number of profiles might also be used. It is intended, therefore, that this invention be limited only by the scope of the appended claims as interpreted in the light of the prior art.

What is claimed is:

1. In a radar height finder system for determining the height above the earth of a distant object in space, said system comprising a radar transmitter and receiver for transmitting and receiving an electromagnetic beam, said transmitter including means for angularly rotating said transmitted beam in a vertical plane, the angular position of said beam with respect to the horizontal at the point of origination representin gthe angle of elevation of said beam, the method comprising the steps of:

generating a first voltage representing range as a function of time;
generating a correction factor voltage which varies as a function of said elevation angle and the specific air mass type N through which said radar beam passes from said transmitter to said object; and
algebraically combining said first voltage and said correction factor voltage in accordance with the equation $$H_t = K(\alpha, N)\left[\frac{R^2}{2r_0} + R \text{ sine } \alpha\right]$$

where $H_t$ is a voltage proportional to the real height of the object above the earth, $K(\alpha, N)$ is said correction factor voltage, $r_0$ is a proportionality factor representing the radius of the earth, R is said first voltage, and $\alpha$ is said elevation angle.

2. In a radar height finder system for determining the height above the earth of a distant object in space, said system comprising a radar transmitter and receiver for transmitting and receiving an electromagnetic beam, said transmitter including means for angularly rotating said transmitted beam in a vertical plane, the angular position of said beam with respect to the horizontal at the point of origination representing the angle of elevation of said beam, the method comprising the steps of:

generating a correction factor voltage which varies as a function of said elevation angle and as a function of the average type air mass through which said radar beam passes from said transmitter to said object;
altering said correction factor voltage to compensate for the specific air mass type;
generating a first voltage representing range as a function of time;
generating a second voltage which is a multiple of said altered correction factor voltage and said first voltage, and dividing the product thereof by $2r_0$, where $r_0$ is a proportionality factor representing the radius of the earth, to derive a third voltage equal to $$\frac{K(\alpha, N)R}{2r_0}$$

where $K(\alpha, N)$ is said correction factor voltage;
generating a fourth voltage which is a multiple of said correction factor voltage and the factor sine $\alpha$, where $\alpha$ is said elevation angle to derive a fifth voltage equal to $K(\alpha, N)$ sine $\alpha$;
algebraically adding said third voltage and said fifth voltage; and
generating a voltage representing a multiple of the summation of said third and fifth voltages and a voltage representing range as said function of time.

No references cited.

UNITED STATES PATENT OFFICE

CERTIFICATE OF CORRECTION

Patent No. 3,069,677              December 18, 1962

George Bruck et al.

It is hereby certified that error appears in the above numbered patent requiring correction and that the said Letters Patent should read as corrected below.

Column 1, line 46, for "represenation" read -- representation --; column 2, line 15, for "moist-" read -- moist; --; column 3, line 33, in the height finding equation, for "$R_2$" read -- $R^2$ --; column 5, line 21, in the equation, for 226 X $10^6$" read -- 2.26 X $10^6$ --; line 51, for "equapped" read -- equipped --; line 53, for "remarkagle" read -- remarkable --; column 6, line 10, for "representin gthe" read -- representing the --.

Signed and sealed this 13th day of August 1963.

(SEAL)
Attest:

ERNEST W. SWIDER
Attesting Officer

DAVID L. LADD
Commissioner of Patents